United States Patent [19]

Rea et al.

[11] 4,299,890

[45] Nov. 10, 1981

[54] SOLID STATE CELL

[75] Inventors: Jesse R. Rea, Burlington; Allen Davis, Cambridge, both of Mass.

[73] Assignee: Duracell International Inc., Bethel, Conn.

[21] Appl. No.: 160,531

[22] Filed: Jun. 18, 1980

[51] Int. Cl.$^3$ ............................................. H01M 10/36
[52] U.S. Cl. .................................. 429/124; 429/191; 429/218
[58] Field of Search .............. 429/191, 218, 162, 124, 429/103, 104

[56] References Cited

U.S. PATENT DOCUMENTS

| | | | |
|---|---|---|---|
| 3,238,437 | 3/1966 | Foster et al. | 429/103 |
| 3,547,700 | 12/1977 | Swindells et al. | 429/191 |
| 3,558,357 | 1/1971 | Takahashi et al. | 429/191 |
| 3,575,715 | 4/1971 | Masters et al. | 429/191 |
| 3,837,920 | 9/1974 | Liang et al. | 429/191 |
| 4,105,807 | 8/1978 | Arora | 429/191 |

OTHER PUBLICATIONS

Gregor, IBM Technical Disclosure Bulletin, vol. 7, No. 6, Nov. 1964.

*Primary Examiner*—Donald L. Walton
*Attorney, Agent, or Firm*—Ronald S. Cornell; Israel Nissenbaum; Martin M. Glazer

[57] ABSTRACT

A solid state ambient temperature cell having a thin layer of an alkali or alkaline earth metal as anode, a thin layer of a solid ionic conductive electrolyte and a thin cathode layer of a metal or metalloid which can accommodate anode cations in the crystalline structure thereof. Such metals or metalloids include bismuth, arsenic, antimony, lead, tin, selenium or tellurium. The cell is dischargeable at high rates and is rechargeable.

23 Claims, No Drawings

SOLID STATE CELL

This invention relates to high energy density solid state electrochemical cells and particularly to such cells having alkali or alkaline earth metal anodes and thicknesses no greater than 5 mils (0.13 mm).

Solid state electrochemical cells have the great advantage of long term stability (10 years or more) resulting from the solid nature of all of the components thereof. However, such cells are dependent upon the ion conduction characteristics of the solid electrolytes used therein which are generally at least several factors lower than the conductivities possible with the use of fluid electrolytes. As a result, such cells are generally unable to sustain high current drains. With the advent of 'super conductors' such as rubidium silver iodide ($RbAg_4I_5$-0.27 $ohm^{-1}cm^{-1}$—room temperature conductivity) it has been possible to construct solid cells having such high current capability. However, the use of such super conductors as solid electrolytes has been exclusively confined to cells having inherently low energy density and low voltage materials such as cells with silver anodes (i.e. $Ag/RbAg_4I_5/RbI_3$ cell-0.2 $Whr/in^3$ and 0.66 volts OCV). Anode materials such as lithium which provide higher energy densities and voltages are reactive with such super conductors and they cannot be effectively used therewith. Accordingly, anode compatible ionic conductors such as LiI ($1 \times 10^{-7} ohm^{-1}cm^{-1}$—room temperature conductivity) are utilized as solid electrolytes in the high energy density cells with a penalty of low current capability (in the low microampere range) being generally accepted. Such cells have thus been generally confined to very low rate applications.

In order to increase the current capability of the high energy density solid state cells such cells are each constructed in a thin layer or thin film configuration (less than 5 mil thickness). The cells are thereafter electrically interconnected, thereby occupying the same volume as a single larger cell. Depending upon the number of interconnected thin cells the current capability is accordingly enhanced as a result of the increased surface areas of anode, cathode and electrolyte.

Thin film high energy density cells with lithium anodes have been described with the system Li/LiI/AgI (2.1 OCV and energy density of 1-5 $Whr/in^3$) (116 J. Elec. Chem. Soc. 1322-1323 and 1452-1454 "High Voltage, Solid State Battery System" Parts I and II by Liang and Bro and Liang, Epstein and Boyle (1969)). However, this system has inherent instability problems as well as involving difficult fabrication. The Li/LiI/AgI thin film cell is constructed by spraying AgI on a silver foil and thereafter successively depositing LiI and Li thereon by vacuum evaporation with the cell having a thickness generally of about 74 microns. The AgI however cannot be effectively simply deposited by vacuum evaporation because of non-uniform growth of AgI crystals and the AgI cathode is therefore sprayed on.

It was however discovered that in such cells the electrolyte is permeated by both silver and lithium ions which react with each other with the long term stability of such cells being thereby adversely affected by such self discharging defeat. Additionally, possibly because of the abrasive nature of the AgI cathode, there is a substantial amount of difficulty in depositing the electrolyte layer without pinholes, the presence of which is generally fatal to cell operation because of the internal cell shorting caused thereby, unless the electrolyte layer is relatively substantially thick.

It is an object of the present invention to provide a very stable high energy density solid state cell system which can be readily formed into thin film cells having thicknesses of less than 5 mils (0.13 mm) and as thin as about 5-15 microns, which cells are dischargeable at relatively high rates.

It is a further object of the present invention to provide such cells which are essentially rechargeable.

It is another object of the present invention to provide such cells as being integral with electronic components or circuitry which they are to power, and whereby they may be quickly and efficiently applied to said electronic components or circuitry.

These and other objects, features and advantages of the present invention will become more evident from the following discussion.

Generally the present invention comprises a cell system which is totally solid and comprises an alkali or alkaline earth metal anode, a solid ionically conductive electrolyte and a cathode active material comprised of a metal or metalloid having an open crystalline structure such as bismuth, arsenic, antimony, lead, tin, selenium or tellurium. The preferred anode material is lithium because of its high energy density with the preferred electrolyte therefor being comprised of an ionically conductive electronically insulative lithium salt such as lithium iodide. The preferred cathode material is bismuth because of its high electronic and lithium ion conductivities as well as relatively high voltage potential with a lithium anode.

The open circuit voltage of a cell having a lithium anode, a lithium iodide electrolyte and a bismuth cathode is 0.83 volts. This is in comparison to the Li/LiI/AgI cell having an OCV of 2.1. Accordingly it is highly preferred that such cell be constructed with a thin film formation wherein such cell system has several significant advantages which more than outweigh the relatively (relative to other lithium cell systems) low voltage obtained. The Li/LiI/Bi cell may be effectively readily entirely constructed by sequential vacuum evaporations. Such deposition method provides for uniformity in layer thickness and increased ease in fabrication. This is in contrast to the thin film cells having AgI cathodes which have been sprayed on since as noted above, AgI is not uniformly deposited by vacuum evaporation. The uniformity of the vacuum evaporation deposition method with the cathodes of the present invention further eliminates the abrasive problem inherent in the cells having AgI cathodes since the metal or metalloid layer is a smooth deposit. As a result, the electrolyte layer may be made thinner without the fear of electrolyte permeating pinholes which can lead to internal cell shorting. In fact thin film cells may be made having a total thickness on the order of about 5-15 microns.

Because of the metal or metalloid nature of the cathode active materials, such as bismuth, they are in themselves electronically conductive. In fact bismuth has been used as a non-cathode active additive in cathodes of solid state cells in order to improve electronic conductivity therein. Furthermore, the cathode materials such as bismuth are, additionally, because of the large interspatial openings in their crystalline structure, capable of easily accommodating anode metal cations. As a result, for example, the bismuth cathode generally requires no further additives for conductivity and in fact may function as its own current collector.

Other materials such as arsenic, antimony, lead, tin, selenium and tellurium are similarly depositable by vacuum evaporation and have similarly large interspatial openings in their crystalline structures.

The cathode materials of the present invention such as bismuth are exceedingly stable and are not subject to the detrimental self discharge reactions of the aforementioned prior art high energy density thin film cells. In fact the reaction of the cathode materials with the anode metal cations is in the form of an intercalation similar to those of transition metal chalcogenides. Such reactions embody accommodation of the anode metal cation within the lattice structure of the cathode material crystals without significant change in the structure of the crystals. Since there is no change in the crystal structure the cathode materials of the present invention have the further advantage of providing an essentially rechargeable cell system. The anode metal cations can therefore be readily extracted from the cathode during the recharging cycle. Additionally, as noted above, the cathode materials such as bismuth which may operate as their own current collectors have such conductivity properties remaining unchanged even during cell discharge.

The cathode materials are described above as being deposited by vacuum evaporation however such materials may be deposited by other equally well known methods such as pressed powder application, spraying, sputtering, chemical vapor deposition, ion beam coating and the like. Vacuum evaporation deposition is however preferred because it is the simplest, most economical method which additionally provides greater uniformity in the deposited layers and enables such layers to be exceedingly thin (with a layered cell being about $5\mu$ thick) without detrimental electrolyte pinhole generation.

In order to enhance conductivity of the solid electrolyte the electrolyte material may consist of mixtures such as LiI and $CaI_2$ which are codeposited in a single vacuum evaporation procedure. The $CaI_2$ acts as a conductivity enhancing dopant as described in U.S. Pat. No. 3,837,920.

Because of the ability of the cathode materials of the present invention to be deposited by vacuum evaporation techniques, in addition to the fact that the cathode materials maintain their original crystalline configuration, cells made therewith may ideally be made as an integral part of electronic components. The sequential vacuum evaporation deposition procedure enhances manufacturing procedures and increases the integrity of both the cell and its connection to the component as an integral part thereof. Maintenance of the original crystalline configuration further ensures that such integrity remains throughout the life of the cell. Thus IC chips may be made initially with their own power supplies with the chip itself also functioning as the cell or battery substrate. Such integrated construction is only possible as a practical matter, with solid state cells because of their long and stable shelf lives generally equal to or greater than the lifetime of the electronic components.

The procedures involved in vacuum evaporation are art recognized such as described in the aforementioned J. Elec. Soc. articles and generally comprise the vaporization of the desired heated material under vacuum from a source such as a crucible or boat containing such materials. The vapors thereafter condense on the desired substrate such as an IC chip with suitable masking to provide each of the desired layers of predetermined thicknesses and configurations. As each layer is deposited, a different source with contained materials is introduced into the vacuum for deposition of the successive materials. Electrical connections to electronic components or between cells may be made during any part of the procedures as required. Stacks of cells to form batteries may thus be easily effected by the continuous depositions.

The following examples are presented as demonstrating the efficacy of the cathode materials of the present invention in providing cells which are easily formed solely by vacuum evaporation, are dischargeable at relatively very high rates without significant polarization and which cells are also rechargeable. Since such examples are for illustrative purposes any enumeration of detail should not be construed as being limitations on the present invention. Unless otherwise indicated all parts are parts by weight.

EXAMPLE 1

A thin film cell is made by successive vacuum ($5 \times 10^{-7}$ torr residual gas pressure) evaporation depositions of layers of bismuth as cathode ($1\mu \times 0.8''$ (2 cm) diameter), lithium iodide as electrolyte ($2\mu \times 0.8''$ (2 cm) diameter) and lithium as anode (13 distributed spots each being $12\mu \times 0.1''$ (0.25 cm) diameter) all on a stainless steel substrate (0.9'' (2.3 cm) diameter). The open circuit voltage of the cell (OCV) is 0.83 volts. The cell is discharged with a constant load of 2 M ohm, with the average current to 28 hours being $0.39\mu$ A ($7.8\mu$ A/cm$^2$) with a delivered capacity of $11\mu$ Ahrs and a capacity of $15\mu$ Ahrs to 45 hours. The latter capacity is 88% of the theoretical capacity of the bismuth which lies directly beneath the lithium. The average voltage is exceedingly stable and ranges between 0.825 volts to 0.743 volts during the entire discharge period.

EXAMPLE 2

A cell identical to the cell in Example 1 is discharged, after storage for 2 months, at a constant load of 124 kohm and a current of $96\mu$ A/cm$^2$. The average load voltage is 0.6 volts and the cell delivers 14 $\mu$Ahrs to 3 hours.

EXAMPLE 3

A cell identical to the cells in the preceeding examples is externally short circuited and maintains a constant current of 1.4 mA/cm$^2$ with a realized capacity of $13\mu$ Ahrs after 11 minutes and $15\mu$ Ahrs after 14 minutes.

The cells in Examples 2 and 3 are discharged at extremely high rates for solid state cells with virtually no polarization losses. Furthermore the cell in Example 2 which is stored for 2 months provides a capacity similar to the cell of Example 1 thereby indicating that the self discharge rate of the cell is essentially zero. The high rates which are maintainable without concomitant loss in capacity indicates the high mobility of the lithium ions in the bismuth lattice. As indicated by the foregoing examples a 3'' (7.6 cm) $\times$ 5'' (12.7 cm) $\times 5\mu$ cell would deliver a constant 6mW for 3 hours after storage of an indefinite period. Batteries may be constructed from stacks of such cells connected in series to increase the voltage thereby providing very thin power sources having high power densities and extremely long shelf-life characteristics. Additionally such cells have reasonably high realizable energy densities of for example 4–5 Whrs/in$^3$ assuming an average load voltage of 0.6 volts.

The energy density of the cells having the cathode materials of the present invention may be further enhanced as a result of the ability of such cells to be recharged with recharging normally being an anomolous mode for high energy density ambient temperature solid state cells. The following example illustrates the recharging capability of such cells.

EXAMPLE 4

A cell identical to the cells in the preceeding examples (after 5 months of storage) is alternately discharged and charged for a period of 3 hours each at a current of about 1 $\mu$A (20 $\mu$A/cm$^2$). After 11 discharge periods the cell provides about 33$\mu$ Ahrs, with a constant discharge voltage of 0.8 volts, more than twice the primary cell capacity.

The preceeding examples are illustrative of the present invention with changes such as in cell structure, materials and methods of construction being possible without departing from the scope of the present invention as defined in the following claims.

What is claimed is:

1. A solid state cell comprising a solid anode comprised of a metal selected from the group consisting of alkali and alkaline earth metals, a solid electrolyte, and an active solid cathode consisting essentially of a metal or metalloid having a crystalline structure able to accommodate cations of said anode metal.

2. The solid state cell of claim 1 wherein said cathode consists essentially of a member of the group consisting of bismuth, arsenic, antimony, lead, tin, tellurium and selenium.

3. The solid state cell of claim 1 wherein said anode is comprised of lithium.

4. The solid state cell of claim 1 wherein said anode, electrolyte and cathode are thin film layers having a total thickness no greater than 5 mils (0.13 mm).

5. The solid state cell of claim 4 wherein said total thickness is no greater than 15$\mu$.

6. The solid state cell of claim 1 wherein said cell is integrated with an electronic component which is powered therewith.

7. The solid state cell of claim 6 wherein said electronic component comprises a substrate upon which said cathode, electrolyte and anode are deposited by successive vacuum evaporations.

8. The solid state cell of claim 3 wherein said electrolyte comprises lithium iodide.

9. The solid state cell of claim 4 wherein said cell is rechargeable.

10. A solid state cell comprising a solid lithium anode, a solid electrolyte comprised of a lithium salt and a solid cathode consisting essentially of a metal selected from the group consisting of bismuth, arsenic, antimony, lead, tin, tellurium and selenium.

11. The solid state cell of claim 10 wherein said cathode metal is bismuth.

12. The solid state cell of claim 11 wherein said lithium salt is lithium iodide.

13. The solid state cell of claim 12 wherein said electrolyte further includes a conductivity enhancing dopant.

14. The solid state cell of claim 13 wherein said dopant is CaI$_2$.

15. The solid state cell of claim 12 wherein said anode, cathode and electrolyte are thin film layers having a total thickness no greater than 5 mils (0.13 mm).

16. The solid state cell of claim 15 wherein said total thickness is no greater than 15$\mu$.

17. The solid state cell of claim 16 wherein said cell is integrated with an electronic component which is powered therewith.

18. The solid state cell of claim 16 wherein said cell is constructed by successive vacuum evaporation deposition of said cathode, electrolyte and anode on a substrate.

19. The solid state cell of claim 18 wherein said substrte comprises an electronic component powered by said cell.

20. The solid state cell of claim 10 wherein said cell is rechargeable.

21. A battery comprised of two or more electrically interconnected cells of claim 1.

22. A battery comprised of two or more electrically interconnected cells of claim 10.

23. A battery comprised of two or more electrically interconnected cells of claim 11.

* * * * *